United States Patent [19]

Seto

[11] Patent Number: 5,289,232
[45] Date of Patent: Feb. 22, 1994

[54] NEGATIVE FILM SUPPLYING DEVICE
[75] Inventor: Izumi Seto, Kanagawa, Japan
[73] Assignee: Fuji Photo Film Co., Ltd., Kanagawa, Japan
[21] Appl. No.: 998,040
[22] Filed: Dec. 29, 1992
[30] Foreign Application Priority Data Jan. 9, 1992 [JP] Japan .................................. 4-002255
Jan. 9, 1992 [JP] Japan .................................. 4-002256

[51] Int. Cl.⁵ .............................................. G03B 27/62
[52] U.S. Cl. ......................................... 355/75; 226/88; 242/76
[58] Field of Search .................... 355/75; 226/88, 196; 242/71.1, 76

[56] References Cited

U.S. PATENT DOCUMENTS 5,153,639 10/1992 Tahara et al. ........................ 355/75
5,213,246 5/1993 Crowley .............................. 226/88

Primary Examiner—Michael J. Gellner
Assistant Examiner—D. P. Malley
Attorney, Agent, or Firm—Sughrue, Mion, Zinn, Macpeak & Seas

[57] ABSTRACT

A negative film supplying device for successively supplying a plurality of negative films to a printing device including: a guide path connected to a negative film guide path of the printing device; a negative film holding member for holding superposed negative films, including guide portions and a base portion interposed between the guide portions, both side portions of the negative films being interposed between the guide portions, and as opposing surfaces of the guide portions move away from the base portion, the opposing surfaces are inclined in directions of approaching each other, and a length of the base portion between said guide portions is smaller than a width of the negative film so that the negative films are curved into convex shapes in the negative film holding member; moving means for moving the negative film holding member by rotating the negative film holding member between a guiding position, at which the base portion of the negative film holding member is disposed on the guide path, and a withdrawn position, at which the base portion is apart from the guide path, around a rotating shaft disposed at a side of and parallel to the guide path of the negative film supplying device; a delivery roller for delivering an outermost negative film; and a conveying roller for conveying the outermost negative film delivered from the guiding position to the printing device.

17 Claims, 9 Drawing Sheets

NEGATIVE FILM SUPPLYING DEVICE

BACKGROUND OF THE INVENTION

1. Field of the Invention

The present invention relates to a negative film supplying device which successively supplies a plurality of rolls of negative film to a printing device.

2. Description of the Related Art

When developed negative films are exposed and are printed onto photographic printing paper, usually, the negative films are set at a negative carrier one at a time. A print operation key is operated, and printing light from a light source passes through the negative film so that the images on the negative film are exposed onto a photographic printing paper. Accordingly, when a plurality of negative films are successively printed, an operator must set the negative film and operate the print operation key each time a negative film is printed.

When a large number of negative films are to be printed successively, often the negative films are connected together by adhesive tape or the like so as to form one long strip of films which is wound on a reel. The reel is loaded in a printing device, and printing processing of all of the negative films is effected automatically. However, after printing, the connected films must be cut into individual units and collated with the printed prints. These processes may result in the negative film being damaged.

As a result, apparatuses have been proposed in which a plurality of negative films are superposed one on top of another and held, and the outermost negative film abuts a driving roller, and the negative films are successively conveyed by the driving force of the driving roller (e.g., U.S. Pat. No. 5,153,639). In this type of device, a plurality of negative films can be automatically and successively conveyed without the negative films being connected in a long strip, and the above-described drawback can be eliminated.

However, negative films are punched so that perforations are formed therein. Burrs, which can be seen if the negative film is examined very closely, exist at the peripheral edges of these perforations. As a result, when the negative films are superposed and only one roll thereof is to be conveyed, the burrs of one of the negative films catch with the burrs of negative films adjacent thereto, and unfortunately, a plurality of the negative films is conveyed simultaneously (multiple-conveying).

Further, when driving force is imparted to the outermost negative film of the superposed negative films, because the negative films contact each other, the friction coefficient thereof is large. Therefore, there are times when the negative films at an inner side of the outermost negative film are delivered simultaneously with the outermost negative film.

Moreover, when the holding of the negative film outside of the innermost negative film is canceled, i.e., when the negative film outside of the innermost negative film is released, the innermost negative film is pushed, especially at a portion thereof upstream of the holding member, due to the influence (the curving and the motion in the direction of thickness) of the rear portion of the negative film before the innermost negative film. Because there is no supporting member corresponding to the upstream portion of the innermost negative film which is pushed, a force opposing the holding force of the holding portion is applied to the innermost negative film, especially at a portion thereof downstream of the holding member, so that the innermost negative film is also released from the holding portion.

SUMMARY OF THE INVENTION

An object of the present invention is to provide a negative film supplying device which can automatically and reliably supply negative films to a printing device one at a time from superposed, set negative films without a plurality of negative films being conveyed simultaneously.

A first aspect of the present invention is a negative film supplying device for successively supplying a plurality of negative films to a printing device comprising: a negative film holding member for holding the negative films in a superposed state, including guide portions and a base portion interposed between the guide portions, both transverse direction end portions of the negative films being interposed between the guide portions, opposing surfaces of the guide portions being inclined so as to approach each other, a length of the base portion between the guide portions being smaller than a width of the negative film so that the negative films are curved into convex shapes in the negative film holding member; moving means for moving the negative film holding member between a guiding position at which the negative film holding member guides the negative films to the printing device and a withdrawn position at which the negative film holding member is apart from the guiding position; delivery means for imparting force in a longitudinal direction of the negative film to a negative film, which is an outermost negative film in the negative film holding member when the negative film holding member is at the guiding position, so as to deliver the outermost negative film to the printing device.

Because the above-described negative film holding member is used, the respective amounts of curvature of the negative films from the innermost negative film to the outermost negative film become gradually larger, and the radii of curvature become gradually smaller. The "outermost" negative film is the negative film which is furthest from the base portion of the negative film holding member when the negative films are held therein. The image surfaces of the negative films do not contact other negative films. Further, the perforations provided in the transverse direction end portions of the negative films do not cling to the perforations of other negative films. Accordingly, burrs which are formed when the perforations are punched do not interfere with the perforations formed in adjacent negative films.

In the device of the present invention, it is preferable that one of the guide portions is inclined more than the other guide portion in order to facilitate the accommodating of negative films into the negative film holding member. Further, a coil spring, for example, may be used so that one of the guide portions can open in a direction of moving away from the other guide portion.

It is preferable to provide a multiple-conveying prevention member formed by extending an end of the base portion of the negative film holding member downstream in a conveying direction of the negative films and by bending an extension of the base portion toward the negative films in order to prevent the negative films at an inner side of the outermost negative film from being conveyed simultaneously with the outermost negative film. By using the multiple-conveying prevention member at the negative film holding member, the moving of the negative films at the inner side of the outermost negative film due to conveying force from the delivery means which is not directly imparted to the inner negative films can be controlled.

Further, it is preferable to provide a fall-out prevention member formed by extending an end of the base portion of the negative film holding member upstream in a conveying direction of the negative films and by bending an extension of said base portion toward the negative films in order to prevent an innermost negative film from falling out of the negative film holding member after the negative film holding member is moved to the withdrawn position. In this way, especially in cases in which there are few negative films remaining at the inner side of the outermost negative film, the fall-out prevention member prevents the inner negative films from falling out of the negative film holding member due to rotation of the negative film holding member.

According to another aspect of the present invention, there is a negative film supplying device for successively supplying a plurality of negative films to a printing device comprising: a negative film holding member for holding the negative films in a superposed state, including guide portions between which both transverse end portions of the negative films are interposed and a base portion interposed between the guide portions; moving means for moving the negative film holding member between a guiding position at which the negative film holding member guides the negative films to the printing device and a withdrawn position at which the negative film holding member is apart from the guiding position; delivery means for imparting force in a longitudinal direction of the negative film to a negative film, which is an outermost negative film in the negative film holding member when the negative film holding member is at the guiding position, so as to deliver the outermost negative film to the printing device; and a multiple-conveying prevention member formed by extending an end of the base portion of the negative film holding member downstream in a conveying direction of the negative films and by bending an extension of the base portion toward the negative films in order to prevent the negative films at an inner side of the outermost negative film from being conveyed simultaneously with the outermost negative film.

It is preferable that the multiple-conveying prevention member is a downstream extension of the base portion of the negative film holding member and is bent toward the negative films, and both transverse direction end portions in a vicinity of an end portion of the extension are bent toward the negative films less than 90 degrees such that as respective folds of the transverse direction end portions approach the end portion of the extension, the respective folds approach each other.

The delivery means may be a single roller disposed on the guide path of the negative film supplying device. The conveying means may be a pair of rollers which is disposed on the guide path of the negative film supplying device and between which the negative film is interposed.

DESCRIPTION OF THE PREFERRED EMBODIMENTS

Figure 1:
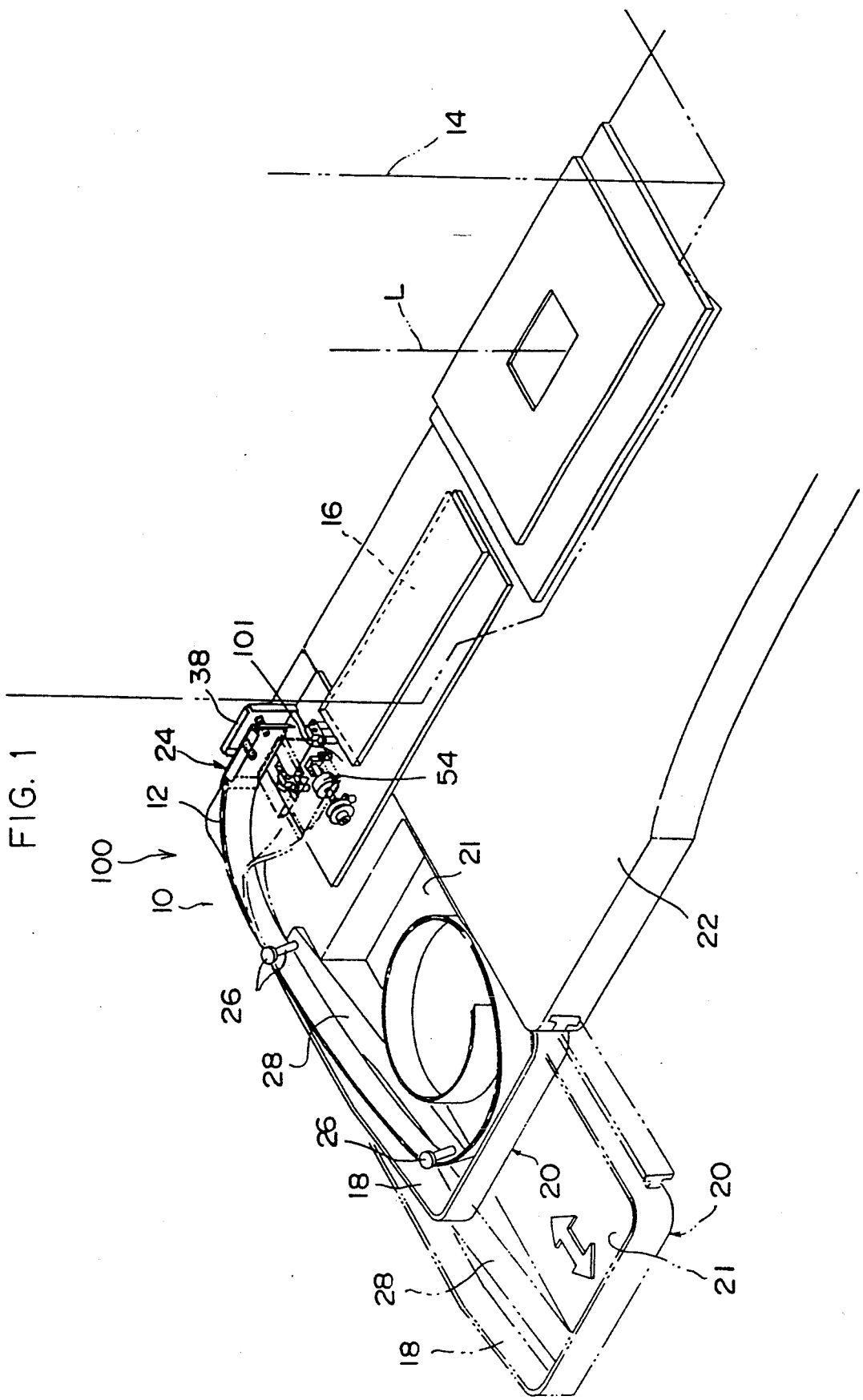
FIG. 1 is a perspective view of a printing device at which a negative film supplying device relating to the present embodiment is installed.

An embodiment of a negative film supplying device of the present invention is illustrated in FIG. 1.

A negative film supplying device 10 is provided adjacent to a printing device 14 in which images recorded on a negative film 12 are printed onto a photographic printing paper. A negative film guide path 16 is provided in the printing device 14. The negative film 12 is passed through the guide path 16 onto a printing optical axis L. The negative film supplying device 10 is mounted so as to be connected to an upstream end portion of the guide path 16.

The negative film supplying device 10 mainly includes a table 20, in which the negative film 12 is accommodated, and a conveying portion 100, which holds a plurality of superposed negative films 12 and conveys the negative films 12 one at a time to the printing device 14. A portion of the table 20 is covered by a vertical wall 18 such that a concave accommodating portion 21 is formed. A bottom surface of the concave accommodating portion 21 is lower than a main table 22 on which the printing device 14 is disposed. The spreading of the negative film 12 due to the elasticity thereof is restrained by the vertical wall 18 so that the negative films 12 can be reliably accommodated in a superposed state. An unillustrated lid, which can be opened and closed, may be attached to the opening of the concave accommodating portion 21.

The table 20 of the negative film supplying device 10 and a holder 24, which will be described later, can be removed from the main table 22. The table 20 is structured so that, when the table 20 is attached to a side portion of the main table 22 as illustrated in FIG. 1, the leading end portions of the negative films 12 held by the holder 24 are located at the furthest upstream position of the guide path 16. Namely, the negative film supplying device 10 can be mounted to existing printing devices 14 and may be removed therefrom as occasion demands.

The negative film 12 is disposed in the concave accommodating portion 21 such that the transverse direction of the negative film 12 runs along the vertical direction. Guide rollers 26 are axially supported at appropriate positions to the bottom portion of the concave accommodating portion 21 so that the respective axes of the guide rollers 26 are substantially perpendicular to the bottom portion. The guide rollers 26 maintain the curved, upright state of the negative films 12.

An inclined surface 28 is formed on the bottom surface of the concave accommodating portion 21 so as to extend from the front side of FIG. 1 to the rear side thereof. The negative films 12 on the table 20 are guided by the guide rollers 26, rise along the inclined surface 28 to the same height as the main table 22, and are supported by the holder 24 of the conveying portion 100. The conveying direction of the negative film 12 on the inclined surface 28 is perpendicular to the conveying direction of the negative film 12 on the guide path 16. As a result, when the negative film 12 has been conveyed up the inclined surface 28, the conveying direction thereof is changed substantially perpendicularly.

A negative film path 101, which connects with the guide path 16 of the printing device 14, is provided in the conveying portion 100. The holder 24, which is a holding member which holds the leading end portions of the negative films 12, is disposed at a side portion of the negative film path 101.

Figure 2:
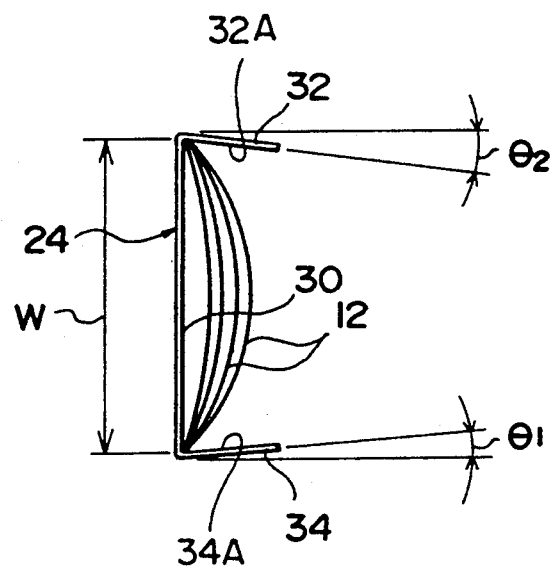
FIG. 2 is a side view of a holder.

FIG. 2 is a side view of the holder 24. The holder 24 is formed by a flat base portion 30 and guide portions 32, 34 so as to be substantially U-shaped. The base portion 30 opposes one of the surfaces of the negative film 12. The guide portions 32, 34 extend from respective transverse direction end portions of the base portion 30 in the direction of thickness of the negative film 12.

Figure 3:
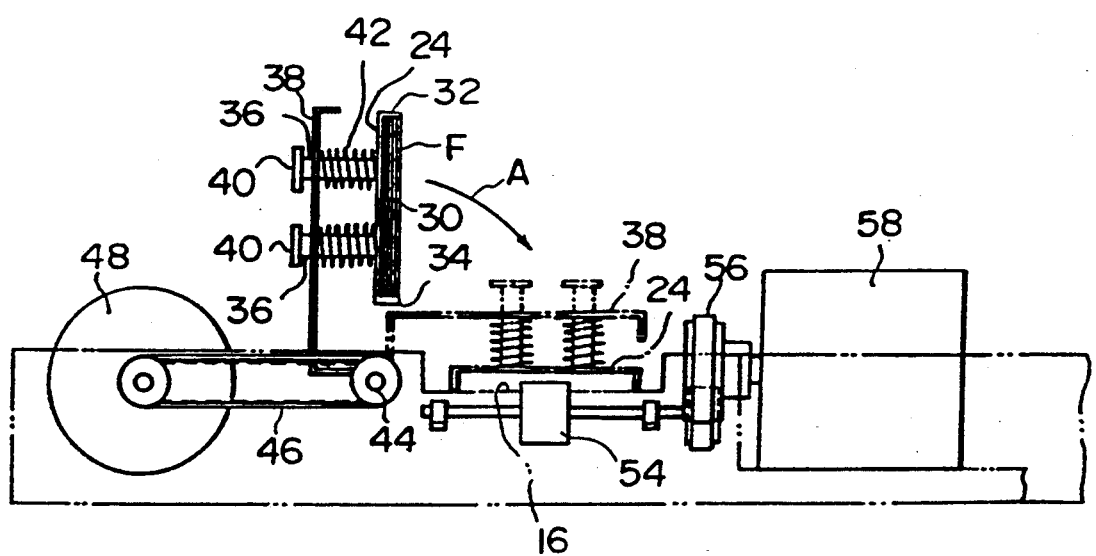
FIG. 3 is a side view illustrating a drive mechanism of the holder as seen from an upstream side of a guide path.

FIG. 3 is a side view of a drive mechanism of the holder 24 as seen from upstream of the holder 24. As shown in FIG. 3, pins 36, which are provided at an intermediate portion of the rear surface of the base portion 30 of the holder 24, penetrate a pivoting arm 38. Stoppers 40 are respectively fixed to end portions of the pins 36. Compression coil springs 42 are provided respectively around the pins 36 and urge the holder 24 in a direction of moving away from the pivoting arm 38. As illustrated in FIG. 3, one end of the pivoting arm 38 is fixed to a rotating shaft 44 whose axis is parallel to the negative film path 101 (a direction perpendicular to the surface of the paper of FIG. 3).

The rotating shaft 44 is connected to a motor 48 via an endless belt 46 so as to receive the rotating force of the motor 48. The base portion 30 can thereby be pivoted in the direction of arrow A in FIG. 3 from a withdrawn position (vertical position), i.e., a position at which the base portion 30 is vertical with respect to the guide path 16, to a guiding position (parallel position), i.e., a position at which the base portion 30 is parallel to the guide path 16.

As illustrated in FIG. 2, a dimension W (e.g., 30 mm) of the base portion 30 in the transverse direction of the negative film 12 is smaller by a predetermined ratio than the transverse direction dimension of the negative film 12 (e.g., 35 mm).

In the present embodiment, the angle between the base portion 30 and the guide portion 34, which is at the lower side when the base portion 30 of the holder 24 is at the vertical position, is 80 degrees. In other words, the guide portion 34 is inclined inwardly at an angle $\theta_1$ of 10 degrees from a position at which the guide portion 34 is perpendicular to the base portion 30.

The angle between the base portion 30 and the guide portion 32, which is at the upper side when the base portion 30 of the holder 24 is at the vertical position, is 75 degrees, i.e., the guide portion 32 is inclined inwardly at an angle $\theta_2$ from a position at which the guide portion 32 is perpendicular to the base portion 30.

The negative films 12 are held in a superposed state at the base portion 30 of the holder 24 structured as described above. The maximum distance between the guide portions 32, 34 is smaller than the transverse dimension of the negative film 12. Therefore, respective intermediate portions of the negative films 12 in the transverse directions thereof form arc-shapes separated from the base portion 30. Further, the respective intermediate portions of the negative films 12 are separated from each other, and the negative films 12 are held between the guide portions 32, 34.

Because the guide portions 32, 34 are inclined as described above, the radii of curvature of the superposed negative films 12 become gradually smaller from the outermost to the innermost negative film 12. Accordingly, the perforations of adjacent negative films 12 are separated from each other. When the perforations are punched in the negative film 12, burrs are generally formed at the peripheral portion of each perforation. However, the present embodiment prevents the burrs of adjacent negative films 12 from interfering with each other.

In order to place the negative films 12 in their curved state between the guide portions 32, 34 of the holder 24, first, ones of the transverse direction end portions of the negative films 12 are placed on the bottom side guide portion 34 and are pushed to the rear of the guide portion 34. Then, with the negative films 12 in a curved state, the other transverse direction end portions thereof are inserted into the inner side of the guide portion 32. In this case, because the angle of inclination of the guide portion 32 is large, the end portions of the negative films 12 on the guide portion 32 side can be guided by the guide portion 32 and inserted to the rear thereof. In this way, when the negative films 12 are loaded, both transverse direction end portions of the negative films 12 can be inserted to the rear portions of the respective guide portions 32, 34. Therefore, the respective centers of the superposed negative films 12 can be superposed conveniently.

After the negative films 12 are accommodated in the holder 24, the holder 24 is brought down to its parallel position. As shown in FIG. 1, the negative films 12 are curved three-dimensionally upstream of the holder 24. Downstream of the holder 24, the negative films 12 are parallel to the guide path 16.

Figure 4:
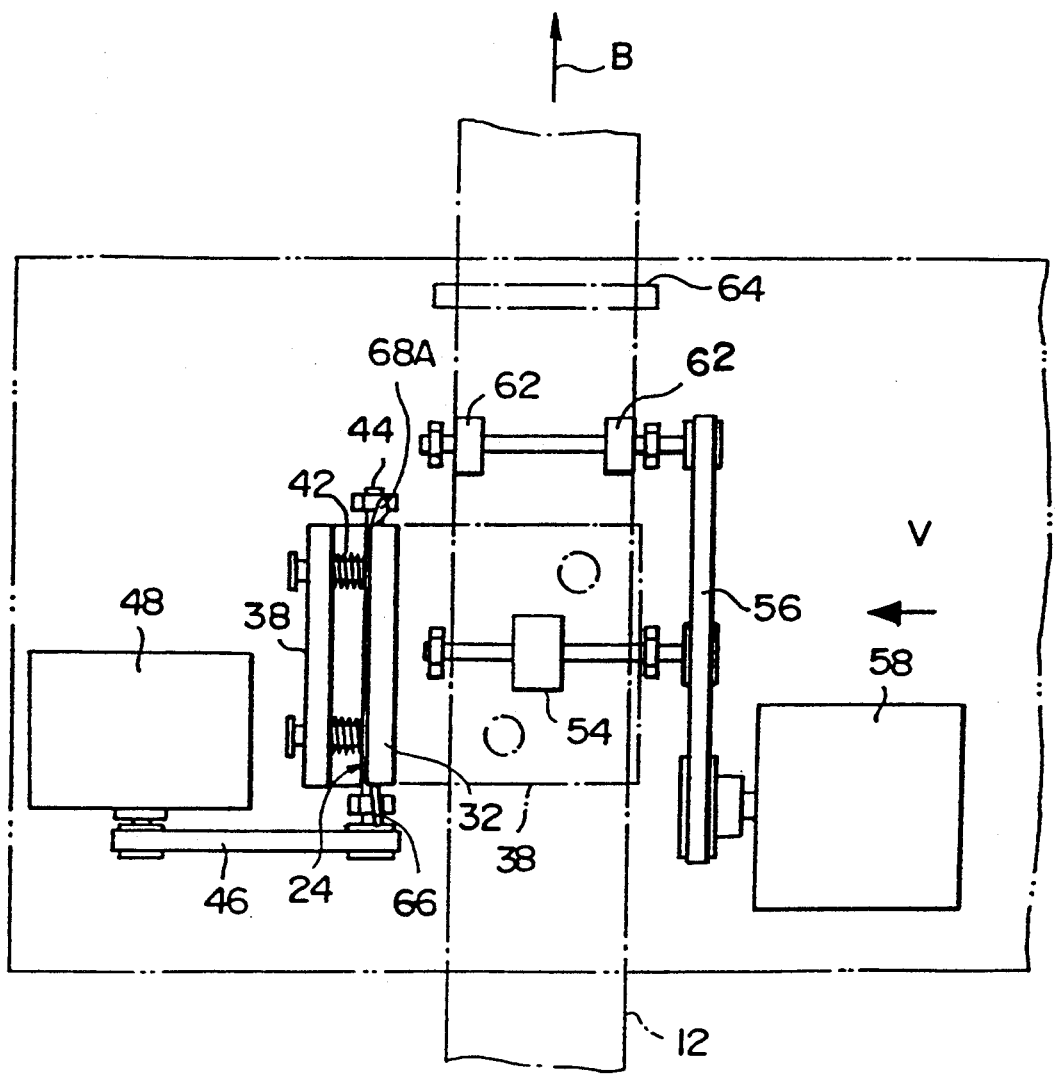
FIG. 4 is a plan view of the holder and periphery thereof.

By bringing the arm 38 down to the parallel position, the leading end portion of the outermost negative film 12 is pressed on a delivery roller 54 disposed on the negative film path 101. As illustrated in FIG. 4, the delivery roller 54 is connected to a motor 58 via an endless belt 56. Due to the driving force of the motor 58, the outermost negative film 12 is delivered out of the holder 24 in the direction of arrow B to the printing device 14.

Because the perforations of adjacent negative films 12 are separated from each other, the outermost negative film 12 and the second outermost negative film 12 do not interfere with each other, and a plurality of the negative films 12 is not delivered simultaneously to the printing device 14.

Figure 5:
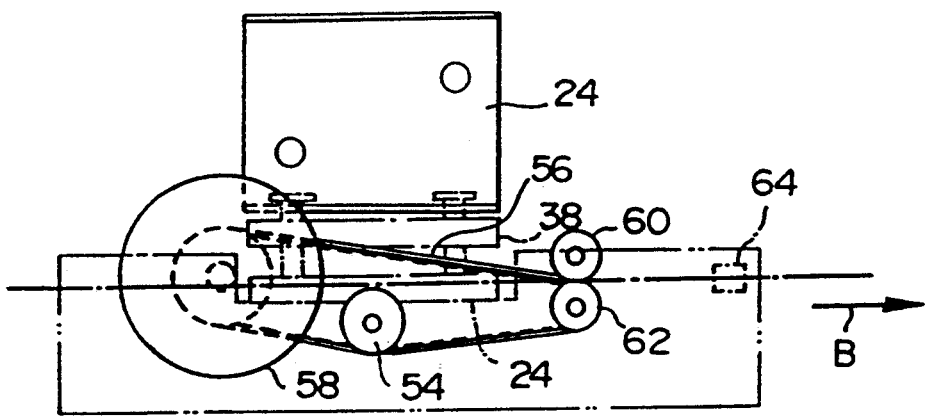
FIG. 5 is a side view of the holder and a delivery mechanism as seen from arrow V in FIG. 4.

As illustrated in FIG. 5, nip rollers 60, 62 are disposed downstream of the delivery roller 54 at the upper and lower side, respectively, of the conveying path of the negative film 12. The nip roller 62 is connected to the motor 58 via the endless belt 56. The negative film 12 delivered from the holder 24 is interposed between the nip rollers 60, 62 so that the driving force of the motor 58 is imparted to the negative film 12. Further, a sensor 64 is disposed downstream of the nip rollers 60, 62. The sensor 64 detects the leading end portion and the trailing end portion of the negative film 12 and can control the driving of the printing device 14. The sensor 64 also has other functions such as detecting images on the negative film 12 and controlling the amount of the negative film 12 to be conveyed to the printing device 14.

Figure 6:
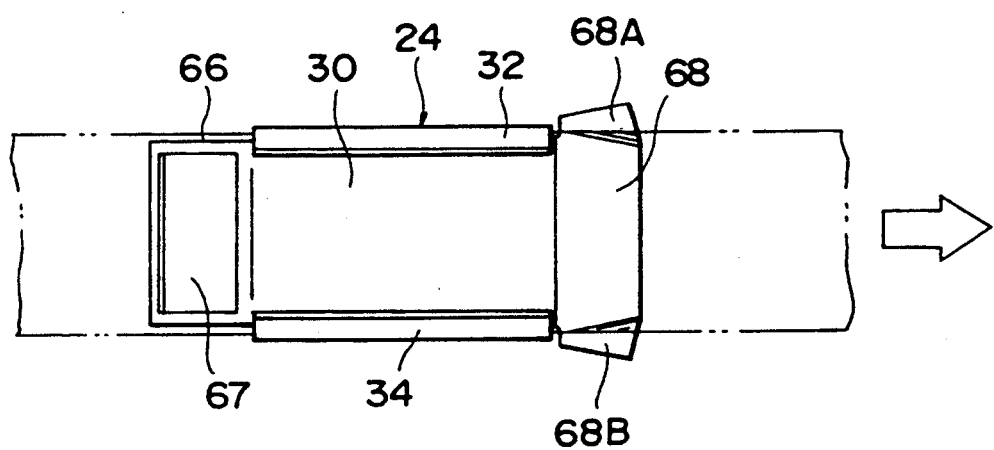
FIG. 6 is a plan view of the holder.
Figure 7:
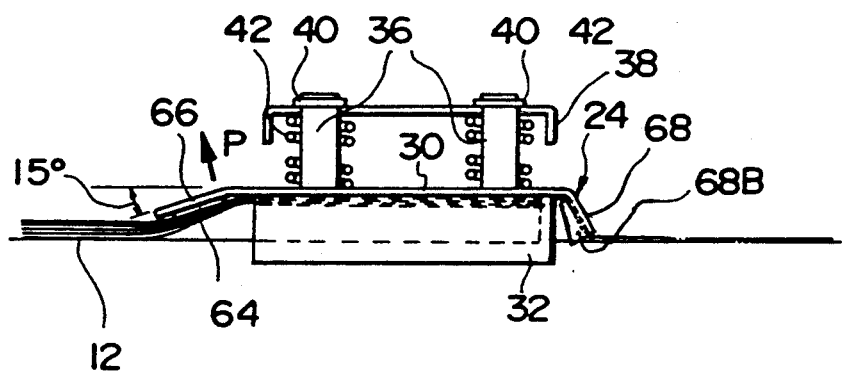
FIG. 7 is a side view corresponding to FIG. 5 when the holder is at a parallel position relative to the guide path.

As shown in FIG. 6, a first guide 66 is provided at the upstream end portion of the base portion 30 of the holder 24. As illustrated in FIG. 7, the first guide 66 is connected to the base portion 30 such that an end portion (the upstream end portion) of the first guide 66 is bent towards the negative film 12 at an angle of approximately 15 degrees. When the holder 24 is pivoted from its parallel position to its vertical position, respective portions, at an upstream side of the holder 24, of the negative films 12 at an inner side of the outermost negative film 12 are pushed by the outermost negative film 12. As a result, it is easy for the respective leading end portions of the negative films 12 at an inner side of the outermost negative film 12 to fall out of the holder 24. The first guide 66 prevents the negative films 12 from falling out. Namely, the first guide 66 restricts the movement of the negative films 12 in the direction of thickness thereof.

It is particularly easy for the negative films 12 to fall out from the holder 24 when the number of the negative films 12 superposed in the holder 24 becomes small. Especially in a case in which there are only two negative films 12 remaining, the first guide 66 prevents the innermost negative film 12 from falling out due to the outermost negative film 12 pushing the innermost negative film 12. A flexible plate 67 made of rubber, synthetic resin or the like is attached to the surface, which opposes the negative film 12, of the first guide 66 to prevent the negative film 12 from being damaged.

Figure 8:
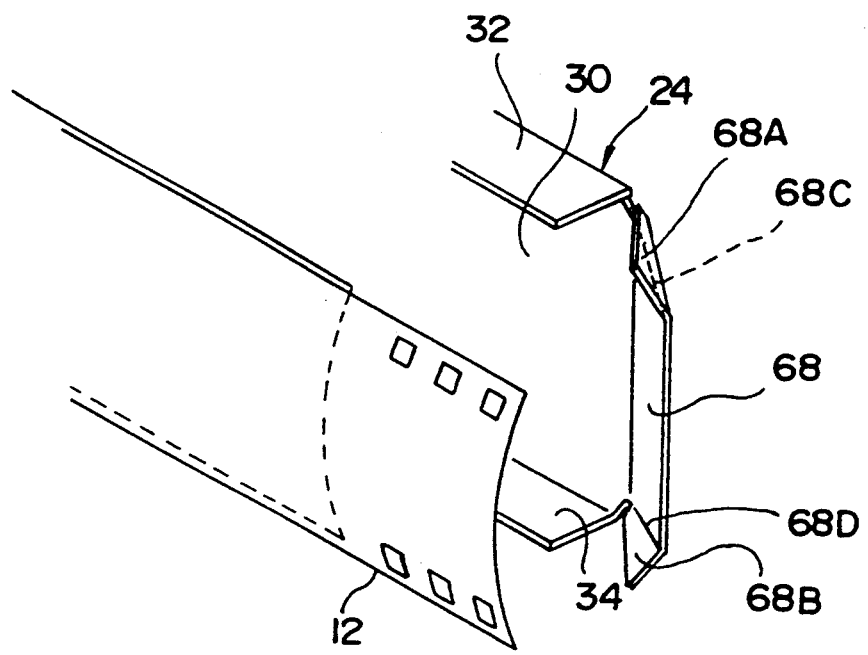
FIG. 8 is a perspective view illustrating a vicinity of a downstream end portion of the holder.

As illustrated in FIGS. 6 and 8, a second guide 68 is provided at the downstream end portion of the base portion 30 of the holder 24. The second guide 68 extends from the base portion 30 in a straight line, and end portions of the second guide 68 in the transverse direction of the negative film 12 form a pair of inclined portions 68A, 68B which are bent in the direction in which the negative films 12 are to be superposed.

As shown in FIG. 8, as the lines 68C, 68D, about which the inclined portions 68A, 68B are respectively bent, move away from the base portion 30, the lines 68C, 68D are gradually inclined in directions of approaching each other.

When the outermost negative film 12 held by the holder 24 is conveyed to the printing device 14, there are cases in which the next negative film 12 moves with the outermost negative film 12 so that a plurality of the negative films 12 are conveyed. Namely, although the perforated portions of the negative films 12 are separated from each other due to the guide portions 32, 34 being inclined as shown in FIG. 2, conveying force is sometimes imparted by the outermost negative film 12 to the negative film 12 at the inner side thereof due to frictional force because the respective transverse direction end portions of the negative films 12 contact each other. The respective leading ends of the outermost negative film 12 and the negative film 12 at the inner side thereof (or other negative films 12 as well), which are being conveyed to the printing device 14, abut the inclined portions 68A, 68B. However, because conveying force is imparted to the outermost negative film 12 by the roller 54, the outermost negative film 12 moves regardless of the inclined surfaces 68A, 68B restricting movement. However, because conveying force is not imparted to the negative films 12 at the inner side of the outermost negative film 12, conveying thereof is prevented by the inclined portions 68A, 68B.

The supplying of the negative film to the printing device by the first embodiment of the negative film supplying device will be described hereinafter.

The table 20 of the negative film supplying device 10 is installed at a side portion of the main table 22 of the printing device 14. The holder 24 is thereby positioned at the furthest upstream position of the guide path 16. Namely, because the table 20 can be installed to an existing printing device 14, the table 20 may be installed whenever necessary, and workability thereby improves.

A plurality of negative films 12 which have undergone developing processing are superposed one on top of another. The rear half portions of the superposed negative films 12 are accommodated in the convex accommodating portion 21 on the table 20.

The intermediate portions of the superposed negative films 12 are guided by the guide rollers 26 and are set along the inclined surface 28 so as to rise from the bottom surface of the table 20. The superposed negative films 12 are curved at an approximate right angle toward the holder 24. Ones of transverse end portions of the respective leading end portions of the negative films 12 are placed on the lower guide portion 34 of the holder 24 and pushed to the back of the guide portion 34. After the negative films 12 are curved, the other transverse direction ends thereof are inserted at the lower surface of the upper guide 32.

In the present embodiment, the angle of inclination of the guide portion 32 is large. Therefore, the transverse direction ends of the negative films 12 at the guide portion 32 side can be inserted to the corner portion formed by the base portion 30 and the guide portion 32. In this way, both transverse direction end portions of the negative films 12 are pushed to the corner portions formed by the base portion 30 and the respective guide portions 32, 34. Therefore, the positions of the centers of the negative films 12 can easily be made to correspond to each other.

When the negative films 12 are held by the holder 24, the transverse dimension of the base portion 30 is smaller than the transverse dimension of the negative films 12. Therefore, each negative film 12 is held such that the intermediate portion in the transverse direction thereof is curved into a convex shape in a direction of moving away from the base portion 30. Further, because the guide portions 32, 34 are inclined in directions of approaching each other, the radii of curvature of the superposed negative films 12 become gradually smaller (i.e., the negative films 12 curve more) toward the outermost negative film 12 (the rightmost negative film 12 in FIG. 2). The image surfaces of the adjacent negative films 12 do not contact each other, and therefore the images are not damaged. Further, burrs, which are formed when perforations are punched in both transverse direction end portions of the negative film 12, do not catch on the perforations of the adjacent negative film 12.

When printing begins, the motor 48 is operated so that the pivoting arm 38 and the holder 24 are pivoted from the vertical position to the parallel position. Accordingly, as illustrated in FIG. 1, only the leading end portions of the negative films 12 are pivoted 90 degrees around an axis parallel to the longitudinal direction thereof. The outermost negative film 12 is pressed to the delivery roller 54.

When the holder 24 is set at its parallel position and the outermost negative film 12 abuts the delivery roller 54, the delivery roller 54 is rotated by the motor 58. The leading end portion of the outermost negative film 12 passes between the nip rollers 60, 62, and the negative film 12 is sent in the direction of arrow B to the printing device 14.

After the leading end portion of the outermost negative film 12 is interposed between the nip rollers 60, 62, the motor 48 is reverse-driven so that the holder 24 is raised to its withdrawn position. In this way, the negative film 12 is delivered even more smoothly.

When the trailing end of the outermost negative film 12 is detected by the sensor 64, the motor 48 is driven again so that the holder 24 is pivoted from its vertical position to its parallel position. The second negative film 12 is pushed to the delivery roller 54 whose longitudinally-directed driving force is imparted to the second negative film 12 so that the second negative film 12 is sent to the printing device 14. In this way, starting from the outermost negative film 12, the negative films 12 are successively sent to printing device 14.

When the number of superposed negative films 12 in the holder 24 becomes small and especially when there are only two negative films 12 remaining therein, the following occurs. With the outermost negative film 12 driven by the delivery roller 54 and interposed between the rollers 60, 62, the motor 48 is driven so that the holder 24 is returned from the parallel position to the vertical position. At this time, the outermost negative film 12, which is being conveyed upstream of the base portion 30 by the rollers 60, 62, is separated from the guide portions 32, 34. The innermost negative film 12 is pushed at a portion of the outermost negative film 12 which has come out of the upstream end portion of the holder 24. A force for making the innermost negative film 12 fall out of the holder 24 is applied (in the direction of arrow P in FIG. 7). However, in the present embodiment, because the first guide 66 is provided at the upstream end portion of the base portion 30, the innermost negative film 12 does not move due to the above-described force and is prevented from falling out of the holder 24.

Second Embodiment

A second embodiment of the present invention will be described hereinafter. Structural portions of the second embodiment which are the same as those in the first embodiment will be denoted with the same reference numerals, and description thereof will be omitted.

Figure 9:
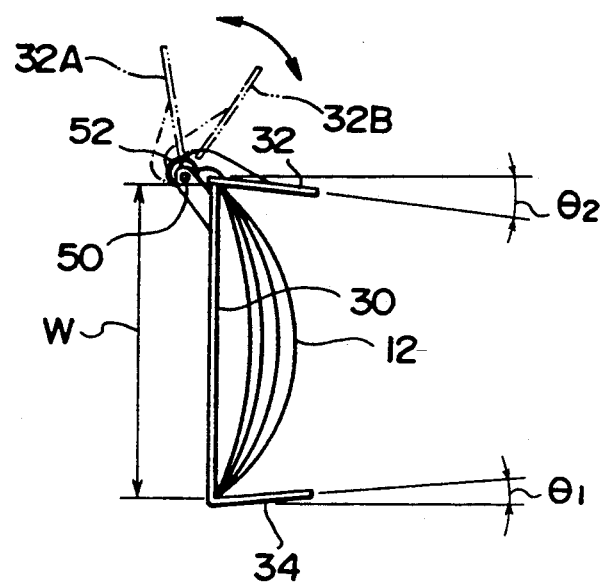
FIG. 9 is a side view, corresponding to FIG. 2, of a case in which a guide portion of a holder relating to a second embodiment can be opened and closed.

As illustrated in FIG. 9, the distinguishing feature of the second embodiment is that the guide portion 32, which is located at the upper side when the holder 24 is at its vertical position, can be opened and closed.

The guide portion 32 of the present embodiment is connected pivotably, like a hinge, to the base portion 30 by a shaft 50. The range of rotation of the guide portion 32 is limited from an open position (denoted by reference numeral 32A), at which a transverse direction end surface of the base portion 30 serves as a stopper and the guide portion 32 is within substantially the same plane as the base portion 30, and a closed position, at which the angle between the base portion 30 and the guide portion 32 is 75 degrees. Namely, when the guide portion 32 is rotated in the closing direction, the guide portion 32 is pivoted to a position at which the guide portion 32 is inclined inwardly, by an angle $\theta_2$ of 15 degrees, from a position at which the guide portion 32 is perpendicular to the base portion 30.

A torsion coil spring 52, which serves as a maintaining means, is provided at the outer circumference of the shaft 50 and urges the guide portion 32 in the closing direction. In this way, the guide portion 32 is prevented from pivoting in the opening direction against the urging force of the torsion coil spring 52 due to the elasticity of the negative films 12. The negative films 12 are accommodated in the guide portion 32 of the present embodiment in the following way.

The holder 24 is placed in its vertical position, and the upper guide portion 32 is placed in its open state. With the guide portion 32 being held open against the urging force of the tension coil spring 52, ones of transverse direction ends of respective leading portions of the negative films 12 are supported by the guide portion 34 of the holder 24 and are propped up against the base portion 30. In this state, the upper guide portion 32 is pivoted in the closing direction against the urging force of the tension coil spring 54. At an intermediate position of rotation, the urging force of the tension coil spring 52 reverses so that the closed position of the upper guide portion 32 is maintained by the urging force. In this way, the superposed negative films 12 are interposed between the guide portions 32, 34 and are supported by and held at the base portion 30.

Because the guide portion 32 can be opened and closed, the work involved in loading the leading end portions of the negative films 12 into the holder 24 is facilitated.

In a variation of the present embodiment, the guide portion 32 may be urged and rotated by the urging force of a helical tension spring. The axis of the helical tension spring swings in accordance with the opening and closing of the guide portion 32 and is disposed so as to intersect the axis of the shaft 50. The urging direction of the helical tension spring is reversed at an intermediate portion of the opening and closing movement of the guide portion 32 (snap action mechanism). Other variations, such as providing an engaging means which is engaged at the closed position of the guide portion 32, are also applicable.

Further, in the present embodiment, the negative film supplying device 10 is formed as a unit which can be attached to and removed from an existing printing device 14. However, the present invention may be structured such that only the table 20 of the negative film supplying device 10 is removable, and the negative films 12 are loaded on the table 20 in advance in a separate place.

Moreover, in the present embodiment, the angle $\theta_1$ of the guide portion 34 is 10 degrees. However, it suffices that $0° < \theta_1 < 15°$. As $\theta_1$ approaches 0°, the negative film 12 may fall out when the holder 24 is pivoted. As $\theta_1$ approaches 15°, the center of the negative film may deviate from its proper position when the negative film is delivered.

What is claimed is:

1. A negative film supplying device for successively supplying a plurality of negative films to a printing device comprising:
 a negative film holding member for holding said negative films in a superposed state, including guide portions and a base portion interposed between said guide portions, both transverse direction end portions of said negative films being interposed between said guide portions, opposing surfaces of said guide portions being inclined so as to approach each other, a length of said base portion between said guide portions being smaller than a width of said negative film so that said negative films are curved in convex shapes in said negative film holding member;

moving means for moving said negative film holding member between a guiding position at which said negative film holding member guides said negative films to the printing device and a withdrawn position at which said negative film holding member is apart from said guiding position;

delivery means for imparting force in a longitudinal direction of said negative film to a negative film, which is an outermost negative film in said negative film holding member when said negative film holding member is at said guiding position, so as to deliver said outermost negative film to the printing device.

2. A negative film supplying device according to claim 1 wherein one of said guide portions is inclined more than another of said guide portions.

3. A negative film supplying device according to claim 1 wherein when said negative films are to be placed at said negative film holding member, one of said guide portions is able to open in a direction of moving away from another of said guide portions.

4. A negative film supplying device according to claim 1 further comprising:

a multiple-conveying prevention member formed by extending an end of said base portion of said negative film holding member downstream in a conveying direction of said negative films and by bending an extension of said base portion toward said negative films in order to prevent said negative films at an inner side of said outermost negative film from being conveyed simultaneously with said outermost negative film.

5. A negative film supplying device according to claim 1 further comprising:

a fall-out prevention member formed by extending an end of said base portion of said negative film holding member upstream in a conveying direction of said negative films and by bending an extension of said base portion toward said negative films in order to prevent an innermost negative film from falling out of said negative film holding member after said negative film holding member is moved to said withdrawn position.

6. A negative film supplying device for successively supplying a plurality of negative films to a printing device comprising:

a negative film holding member for holding said negative films in a superposed state, including guide portions between which both transverse end portions of said negative films are interposed and a base portion interposed between said guide portions;

moving means for moving said negative film holding member between a guiding position at which said negative film holding member guides said negative films to the printing device and a withdrawn position at which said negative film holding member is apart from said guiding position;

delivery means for imparting force in a longitudinal direction of said negative film to a negative film, which is an outermost negative film in said negative film holding member when said negative film holding member is at said guiding position, so as to deliver said outermost negative film to the printing device; and a multiple-conveying prevention member formed by extending an end of said base portion of said negative film holding member downstream in a conveying direction of said negative films and by bending an extension of said base portion toward said negative films in order to prevent said negative films at an inner side of said outermost negative film from being conveyed simultaneously with said outermost negative film.

7. A negative film supplying device according to claim 6 wherein said multiple-conveying prevention member is a downstream extension of said base portion of said negative film holding member and is bent toward said negative films, and both transverse direction end portions in a vicinity of an end portion of said extension are bent toward said negative films less than 90 degrees such that as respective folds of the transverse direction end portions approach the end portion of said extension, the respective folds approach each other.

8. A negative film supplying device according to claim 6 further comprising:

a fall-out prevention member formed by extending an end of said base portion of said negative film holding member upstream in a conveying direction of said negative films and by bending an extension of said base portion towards said negative films in order to prevent an innermost negative film from falling out of said negative film holding member after said negative film holding member is moved to said withdrawn position.

9. A negative film supplying device for successively supplying a plurality of negative films to a printing device comprising:

a guide path connected to a negative film guide path of the printing device;

a negative film holding member for holding said negative films in a superposed state, including guide portions and a flat base portion interposed between said guide portions, both transverse direction end portions of said negative films being interposed between said guide portions, opposing surfaces of said guide portions being inclined so as to approach each other, a length of said flat base portion between said guide portions being smaller than a width of said negative film so that said negative films are curved into convex shapes in said negative film holding member;

moving means for moving said negative film holding member by rotating said negative film holding member between a guiding position, at which said flat base portion of said negative film holding member is disposed on said guide path and is substantially parallel to said guide path, and a withdrawn position, at which said flat base portion is apart from said guide path and is disposed substantially vertical to said guide path, around a rotating shaft disposed at a side of and parallel to said guide path of said negative film supplying device;

delivery means for imparting force in a longitudinal direction of said negative film to a negative film, which is an outermost negative film in said negative film holding member when said negative film holding member is disposed on said guide path, so as to deliver said outermost negative film out of said negative film holding member;

conveying means for receiving said outermost negative film delivered from said guide position by said delivery means and for conveying said outermost negative film to the printing device; and a multiple-conveying prevention member formed by extending an end of said base portion of said negative film holding member downstream in a conveying direction of said negative films and by bending an extension of said base portion toward said negative films in order to prevent said negative films at an inner side of said outermost negative film from being conveyed simultaneously with said outermost negative film;

wherein said negative film supplying device is controlled such that when said negative film holding member is at said withdrawn position, said superposed negative films are loaded into said negative film holding member, and thereafter, said negative film holding member is moved by said moving means to said guiding position, said outermost negative film is delivered, and said delivered outermost negative film is received by said conveying means, and thereafter, said negative film holding member is moved to said withdrawn position, and said negative film is conveyed.

10. A negative film supplying device according to claim 9 further comprising:

a fall-out prevention member formed by extending an end of said base portion of said negative film holding member upstream in a conveying direction of said negative films and by bending an extension of said base portion towards said negative films in order to prevent an innermost negative film from falling out of said negative film holding member after said negative film holding member is moved to said withdrawn position.

11. A negative film supplying device according to claim 9 wherein when said negative films are to be placed at said negative film holding member, one of said guide portions is able to open in a direction of moving away from another of said guide portions.

12. A negative film supplying device according to claim 9 wherein said delivery means is a roller disposed on said guide path of said negative film supplying device.

13. A negative film supplying device according to claim 9 wherein said conveying means is a pair of rollers disposed on said guide path of said negative film supplying device.

14. A negative film supplying device according to claim 9 wherein opposing guide surfaces of said negative film holding member are inclined at angles of 0° to 15°, respectively, in directions of approaching each other.

15. A negative film supplying device according to claim 9 further comprising a table for accommodating said superposed negative films.

16. A negative film supplying device according to claim 15 wherein said table is removable from said negative film supplying device.

17. A negative film supplying device according to claim 9 wherein said negative film supplying device can be removably installed at said printing device.

* * * * *